US009678206B2

(12) United States Patent
Sneed (10) Patent No.: US 9,678,206 B2
(45) Date of Patent: Jun. 13, 2017

(54) SYSTEMS AND METHODS FOR INFERRING LOCALIZED HAIL INTENSITY

(71) Applicant: Dynamic Weather Solutions, Inc., Plano, TX (US)

(72) Inventor: Daron Sneed, Plano, TX (US)

(*) Notice: Subject to any disclaimer, the term of this patent is extended or adjusted under 35 U.S.C. 154(b) by 244 days.

(21) Appl. No.: 14/071,414

(22) Filed: Nov. 4, 2013

(65) Prior Publication Data

US 2014/0176362 A1    Jun. 26, 2014

Related U.S. Application Data

(60) Provisional application No. 61/729,274, filed on Nov. 21, 2012.

(51) Int. Cl.
*G01S 13/95* (2006.01)
*G01S 13/58* (2006.01)
(Continued)

(52) U.S. Cl.
CPC ............. *G01S 13/95* (2013.01); *G01S 7/003* (2013.01); *G01S 7/22* (2013.01); *G01S 13/58* (2013.01);
(Continued)

(58) Field of Classification Search
CPC .......................................... G01S 13/95–13/958
(Continued)

(56) References Cited

U.S. PATENT DOCUMENTS

| 5,583,972 A * | 12/1996 | Miller | G01S 13/951 324/640 |
| 6,125,328 A * | 9/2000 | Baron | G01S 13/951 702/3 |

(Continued)

OTHER PUBLICATIONS

Lahiff, C.T., 2005: Vertically integrated liquid density and its associated hail size range across the Burlington, Vermont county warning area. Eastern Region Technical Attachment, No. 2005-01, National Weather Service, NOAA, Department of Commerce. 20 pp., Bohemia, NY.*

*Primary Examiner* — Peter Bythrow
(74) *Attorney, Agent, or Firm* — John Lindsay (57) ABSTRACT

The present invention is directed to system and method of processing meteorological data. The process comprises receiving a meteorological data corresponding to a geographic region from at least one meteorological data source for a selected time slice, with the meteorological data including radar reflectivity data. The system processes the meteorological data to derive probability of severe hail for points within the geographic region, processes the meteorological data to derive vertically integrated liquid for the points within the geographic region, and processes the meteorological data to derive enhanced echo tops for the points within the geographic region. The system processes the vertically integrated liquid and the enhanced echo tops to derive vertically integrated liquid density for the points within the geographic region and processes the probability of severe hail and the vertically integrated liquid density to derive derived hail index numbers for the points within the geographic region. The system generate data packets of the derived hail index numbers, with each of the derived hail index numbers corresponding to a local geographic point.

18 Claims, 13 Drawing Sheets

(51) Int. Cl.
   *G01S 7/00* (2006.01)
   *G01S 7/22* (2006.01)
   *G01S 13/87* (2006.01)

(52) U.S. Cl.
   CPC .......... *G01S 13/87* (2013.01); *G01S 13/951* (2013.01); *G01S 13/958* (2013.01)

(58) Field of Classification Search
   USPC ................ 342/26 R, 26 A, 26 B, 26 C, 26 D
   See application file for complete search history.

(56) References Cited

U.S. PATENT DOCUMENTS

| | | | | |
|---|---|---|---|---|
| 6,339,747 B1* | 1/2002 | Daly | ........................ | G01W 1/10 702/3 |
| 6,340,946 B1* | 1/2002 | Wolfson | ................ | G01S 13/953 342/175 |
| 6,670,908 B2* | 12/2003 | Wilson | ................... | G01S 13/951 342/176 |
| 6,683,609 B1* | 1/2004 | Baron, Sr. | ............... | G01W 1/10 345/419 |
| 7,109,913 B1* | 9/2006 | Paramore | .............. | G01S 13/953 342/176 |
| 7,191,064 B1* | 3/2007 | Myers | ..................... | G01W 1/10 702/3 |
| 7,307,577 B1* | 12/2007 | Kronfeld | ............... | G01S 13/953 342/118 |
| 7,486,220 B1* | 2/2009 | Kronfeld | ............... | G01S 13/953 342/26 B |
| 7,558,674 B1* | 7/2009 | Neilley | .................... | G01W 1/10 702/3 |
| 8,111,186 B2* | 2/2012 | Bunch | ..................... | G01W 1/10 342/26 B |
| 8,159,369 B1* | 4/2012 | Koenigs | .................. | G01S 7/062 340/963 |
| 2003/0025627 A1* | 2/2003 | Wilson | .................. | G01S 13/951 342/26 D |
| 2007/0005249 A1* | 1/2007 | Dupree | .................... | G01S 13/89 702/3 |
| 2009/0177343 A1* | 7/2009 | Bunch | ..................... | G01S 13/953 701/14 |
| 2009/0182507 A1* | 7/2009 | Havin | ..................... | G01W 1/10 702/3 |
| 2010/0245165 A1* | 9/2010 | Kauffman | ............ | G01S 13/953 342/26 B |

* cited by examiner

| Timestamp | Latitude | Longitude | Particle Size | Number of Particles | Height of Particles | Probability of Severe Hail |
|---|---|---|---|---|---|---|
| | | | | | | |
| | | | | | | |

SYSTEMS AND METHODS FOR INFERRING LOCALIZED HAIL INTENSITY

PRIORITY

The present invention claims priority to provisional application 61/729,274, which has a filing date of Nov. 21, 2012 and is incorporated by reference.

BACKGROUND

Field of the Invention

The present invention relates to meteorological data processing and display systems, and more specifically to systems and methods of calculating and displaying localized hail activity.

Description of the Related Art

There is currently a lack of precision in automated processing and reporting of the intensity of a hail storm. That is to say that the size, density, and duration of hail at a particular location is not readily available and in a format for consumption in order to take meaningful action in response to the hail data. Limited processing and reporting is available for one of the options but not all three. For example, current reporting may readily show "quarter size hail," but fail to readily include the duration of that hail size during the hail event or only indicate that hail of that size occurred in a broad region of a metropolis.

This lack of precision in hail storm data has business-wide adverse impact. For example, in the insurance industry, insurance adjusters must investigate and prove or disprove claims after a hail storm. Due to the nature of a hail storm, a large number of reports for investigation are received afterward in a short period of time. Time can be of the essence in investigating such claims due to the liability of the insurance company. As more time passes between the hail storm and the insurance investigation, the more difficult it is to establish the hail storm as the cause of damages to property. Currently an adjuster's primary option is to visit the insured sites without being able to prioritize the insured sites by probability of meaningful damage, resulting in inefficient use of limited time.

Again, the deficiency in processing of historical meteorological data for intensity of hail storms in a readily used format is shown in the insurance industry. The fundamental approach of insurance is to spread risk across the pool of the insured. Additionally, the decision to underwrite and the premiums assessed are adjusted based on the potentially insured party. Currently, the lack of precision in hail storm data processing and reporting limits the ability use the historical data to focus on prior hail storm events for a localized area and thus make meaningful underwriting decisions.

For the above reasons, it would be advantageous to have a system and methods of processing and displaying hail event data in a readily perceptible format.

SUMMARY

The present invention is directed to system and method of processing meteorological data. The process comprises receiving meteorological data corresponding to a geographic region from at least one meteorological data source for a selected time slice, with the meteorological data including radar reflectivity data. The system processes the meteorological data to derive probability of severe hail for points within the geographic region, processes the meteorological data to derive vertically integrated liquid for the points within the geographic region, and processes the meteorological data to derive enhanced echo tops for the points within the geographic region. The system processes the vertically integrated liquid and the enhanced echo tops to derive vertically integrated liquid density for the points within the geographic region and processes the probability of severe hail and the vertically integrated liquid density to derive derived hail index numbers for the points within the geographic region. The system generate data packets of the derived hail index numbers, with each of the derived hail index numbers corresponding to a local geographic point.

These and other features, aspects, and advantages of the invention will become better understood with reference to the following description, and accompanying drawings.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
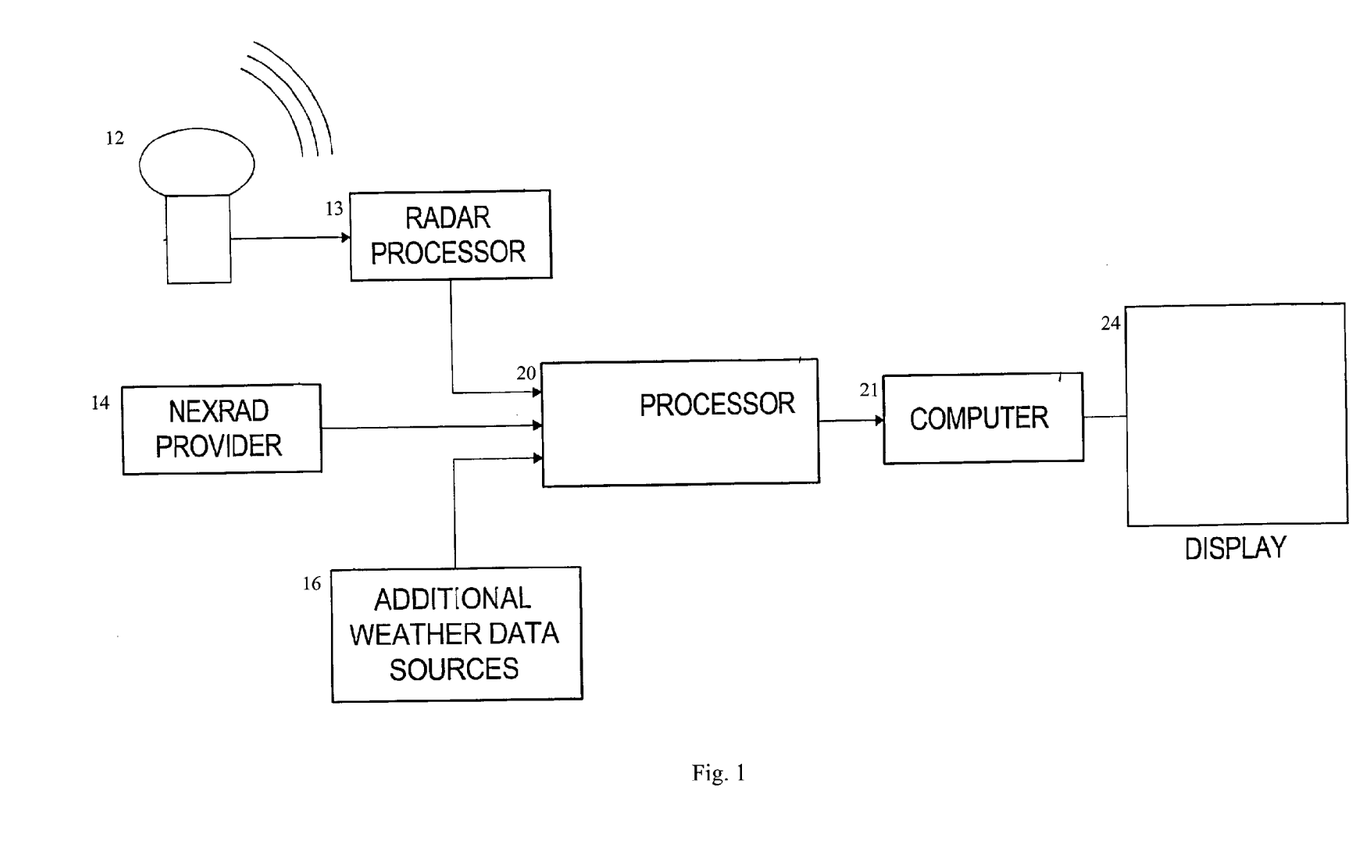
FIG. 1 depicts an embodiment of a system according to the current invention.

The present invention is directed to a system and process for inferring probable hail size, density, and duration for a selected area and presenting a graphical representation of the same. Referring to FIG. 1, the major components of an embodiment of the system 10 is presented. Meteorological data sources 12 13 14 16, a processor 20 of a computer 21, and a display 24 are illustrated. Doppler radar 12 coupled to a radar processor 13 as one source of meteorological data is shown. NOMAD 14, as a second source of meteorological data is shown. Additional data sources 16, such as alternate online providers, may exist as another source of meteorological data is shown. A computer 21 having a processor 20 compiles, processes, and stores meteorological data. The processor 20 outputs data packets for transmission and presentation on a display 24.

A computer 21 as referred to in this specification generally refers to a system which includes a central processing unit (CPU), memory, a screen, a network interface, and input/output (I/O) components connected by way of a data bus. The I/O components may include for example, a mouse, keyboard, buttons, or a touchscreen. The network interface enables data communications with the computer network. A server is a computer 21 containing various server software programs and preferably contains application server software. A minicomputer is a computer 21 such as a smartphone or tablet PC with smaller dimensions, such as iPhone, iPod Touch, iPad, Blackberry, or Android based device. Those skilled in the art will appreciate that computer 21 may take a variety of configurations, including personal computers, hand-held devices, multi-processor systems, microprocessor-based electronics, network PCs, minicomputers, mainframe computers, and the like. Additionally, the computer 21 may be part of a distributed computer environment where tasks are performed by local and remote processing devices that are linked. Although shown as separate devices, one skilled in the art can understand that the structure of and functionality associated with the aforementioned elements can be optionally partially or completely incorporated within one or the other, such as within one or more processors. As noted above, the processes of this invention, or subsets thereof, may exist in on one or more computers such as a client/server approach. The process, or subsets thereof, may exist in a machine-readable medium. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program or "app" which may be transferred from a remote computer to a requesting computer by way of data signals embodied in a carrier wave or other propagation medium via a communication link.

Figure 2:
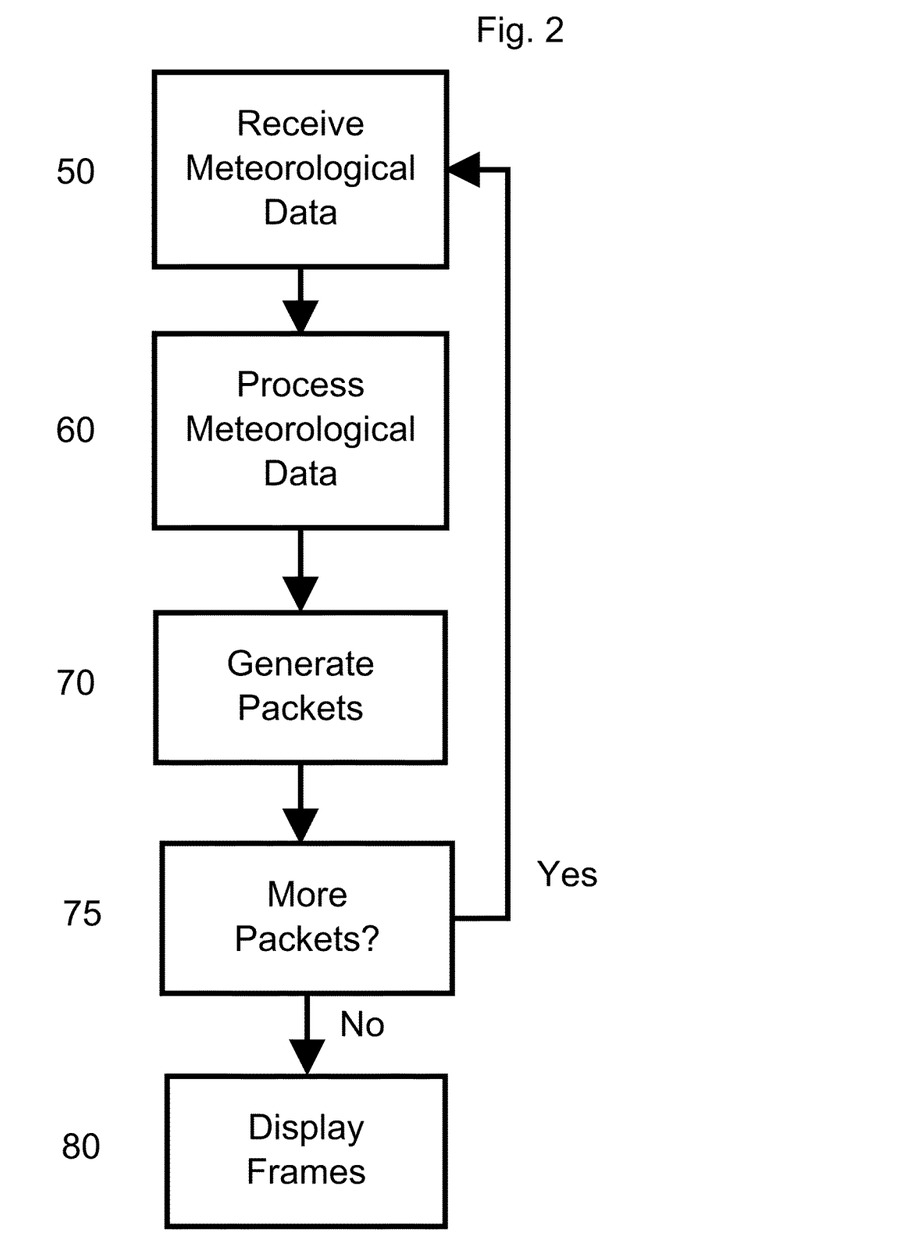
FIG. 2 depicts a flowchart of the major steps of a process implemented to an embodiment of a system according to the current invention.

Referring to FIG. 2, the system 10 receives meteorological data for a selected geographical area for a selected time frame 50. The system 10 processes and transforms the received meteorological data 60. The system 10 then generates a series of data packets representing map data and hail intensity overlay data in the form of a derived hail intensity index representing visual data frames 70. The exemplary system 10 displays the data packets as a sequence of overlaid visual frames 80 for ready perception of the probable hail size, density, and duration for the selected geographical area and selected time period.

Figure 3:
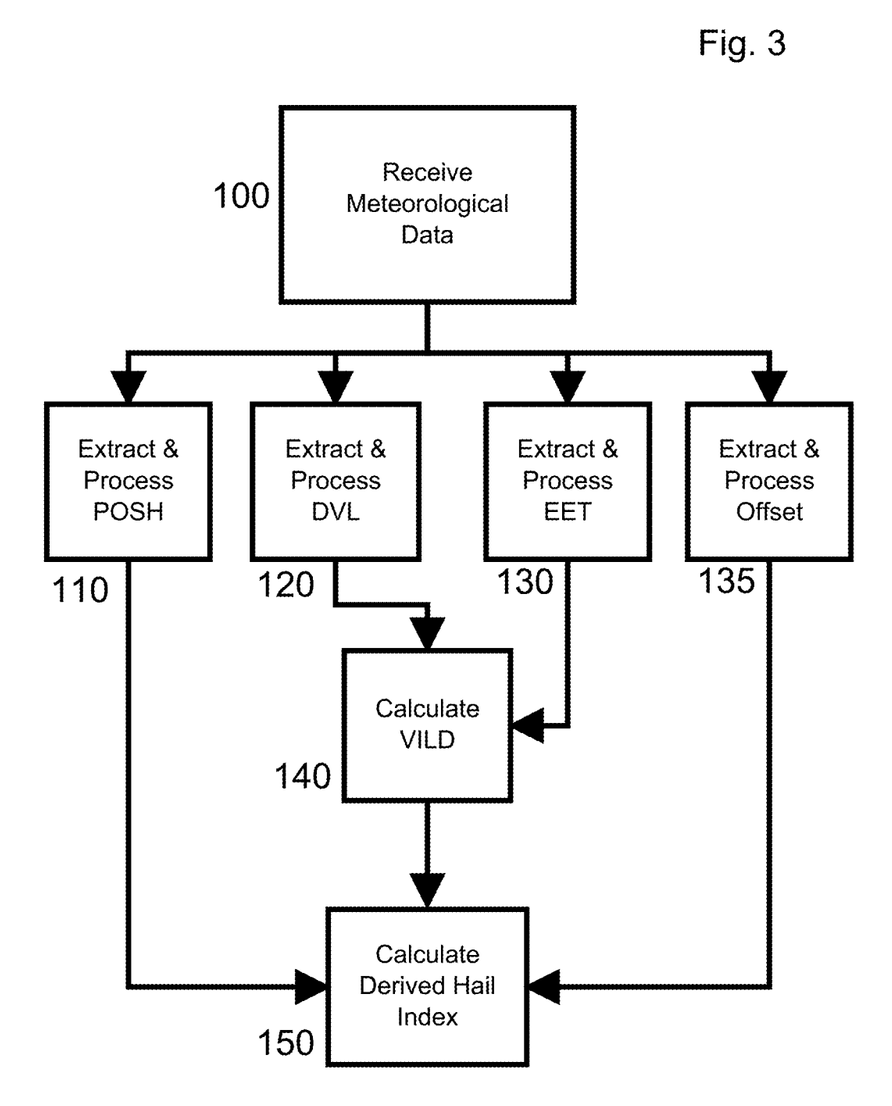
FIG. 3 depicts a flowchart of a subset of the process of FIG. 1.

Now referring to FIG. 3, a more detailed disclosure of the above embodied process is shown. The system 10 receives meteorological data 100. In one configuration, doppler radar units are C-band or X-band Doppler meteorological surveillance radar with automatic computer processing systems. The system may further include S-band to supplement. These radar units provide measurement of both reflectivity and velocity of liquid and can scan volumetrically to produce detailed data. In a reflectivity mode, the liquid echoes are scaled to correspond directly to values of liquid content. In velocity mode, the radar measures the movement of scattering particles along the radar beam. In one configuration, meteorological data including precipitation, cloud cover data, the bottom and top of cloud formations, and reflectivity and velocity of liquid are acquired from C-band Doppler radar, which is combined with NEXRAD data, and the data is digitized and stored for real-time, near real-time, or historical processing. The full volumetric data of the storm enables the system to "slice" a storm to view cross sections from various angles, and from various vantage points. The meteorological data sources 12 13 14 16, directly or indirectly, and without exclusion, can include data products such as rainfall intensity, reflectivity, composite reflectivity, clear air mode, precipitation mode, echo tops, vertical integrated liquid, surface rainfall accumulation, radial velocity, velocity azimuth display winds, winds aloft, wind shear, microburst activity, and the like.

Figure 4:
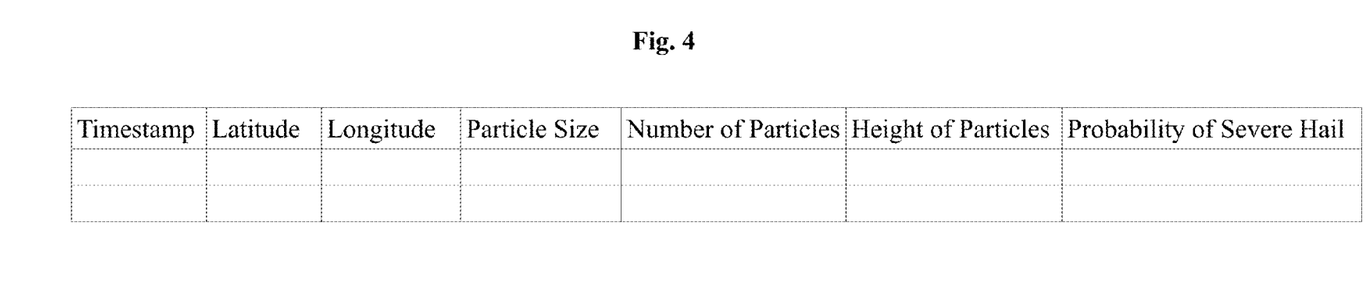
FIG. 4 depicts a representative partial database schema for input into the process and system of FIG. 1.

FIG. 4 shows a representative partial database schema for input to the current embodiment of the system 10. It includes series of rows or "slices" having a timestamp for a particular set of data, a latitude and latitude, water particle size, number of water particles, the height of those water particles, and the probability of severe hail ("POSH"). It is to be understood that the input meteorological data can be pre-processed prior to input to the system 10 or post-processed for use by the system 10. For example, as the basis of the data in this configuration is received from radar incident or at an angle relative to the atmosphere being sampled, latitude and longitudinal data for the ground position of the sampled air column is computed as known in the art. For example, water particle size may represent an average of an array of water particles within the particular data set. In an exemplary configuration, the meteorological data is received from external sources, preferably the National Climactic Data Center NEXRAD Data Inventory 14.

The system 10 may supplement the radar data 12 or NEXRAD data 14 with additional data sources 16.

Referring to FIG. 3, the system 10 processes the meteorological data in plural data channels 110 120 130. A first data channel is the hail index 110 for use in locating storm cells which have the potential to produce hail. More specifically, the preferred subset of hail index information is the probability of severe hail 110 data, which indicates the probability of severe hail within the area of representing the particular dataset. It is commonly represented by a value between zero and one hundred percent. In a first configuration, it is derived from the input meteorological data. In a second configuration, it is derived from the input meteorological data and provided by a third party. Additional information on the derivation of hail index and probability of severe hail is annexed and incorporated by reference.

A second data channel is the vertically integrated liquid 120 data, which is useful in determining the amount of precipitation that the radar detects in a vertical column of the atmosphere for an area. It is determined as known in the art. In a first configuration, it is derived from the input meteorological data. In a second configuration, it is derived from the input meteorological data and provided by a third party. Additional disclosure of vertical integrated liquid calculation is annexed and incorporated by reference.

A third data channel is the enhanced echo tops 130, which is useful in determining the peak height of an atmospheric area of precipitation. It is determined as known in the art. In a first configuration, it is derived from the input meteorological data. In a second configuration, it is derived from the input meteorological data and provided by a third party. Additional disclosure of enhanced echo tops determination is annexed and incorporated by reference.

Having the enhanced echo top 130 and the vertically integrated liquid 120 data, the system 10 calculates the vertically integrated liquid (VIL) density 140. This embodiment calculates the VIL density as known in the art. This embodiment employs the following formula:

(VIL/Echo Top)*1000 to yield a value in g/m³.

An optional fourth data channel is the spatial offset 135, which is useful in determining potential spatial offset of hail position from atmospheric formation to ground level impact. The spatial offset is determined determining the hail potential for a given area. The system starts with the hail's anticipated position at enhanced echo top above ground level. A vector is formed applying the gravitational constant from that altitude to ground level. The vector is adjusted based on storm motion and wind direction data. More specifically, vectors from fields such as radial velocity, velocity azimuth display winds, winds aloft, wind shear, and microburst activity at different altitudes between the echo top and ground level are accumulated. An offset value for ground level (or proximate ground level) is calculated and applied.

Having the VIL density and probability of severe hail data, the system 10 prepares a series of data packets to facilitate display of hail activity. In addition to the visual map data, each data packet contains hail activity overlay data. The data packets represent map data and hail activity overlay for a selected geographic area and a selected time window, each data packet representing a single visual frame of the same dimension. Each data packet contains hail activity data for the same selected geographic area. That is to say the geographic boundaries represented by each of the data packets is the same. Further, a coordinate, typically an x, y cartesian coordinate or the like, representing a pixel in one data packet corresponds to the same underlying position within the selected geographic area across the series of data packets.

Each data packet is based on meteorological data from a single time slice, with the series of data packets representing a chronologically ordered sequence of hail activity. The data packet is structured for transformation to an image showing hail activity in that time slice or subset thereof, with the series of images visually depicting the size, density, and duration of the hail activity.

As previously mentioned, the exemplary data packets include visual map data and hail activity overlay data. The hail activity overlay data is based on a derived hail index 150. In an exemplary configuration, each point or pixel in the geographic area represented by the data packet includes a derived hail index number. In the current embodiment, the derived hail index is a scaled number representing the intensity of the hail activity, indicating how the system 10 should visually represent the data packet in its transformation to an image. In one configuration, a high derived hail index indicates high hail activity. The system's 10 visual depiction of the derived hail index overlay data is configurable. For example, where a single color is used to represent derived hail index, a high derived hail index might be represented by a light color. In an alternate configuration, the system 10 might represent different ranges of the derived hail index scale with different colors. In such a configuration, the system 10 would visually display the color corresponding to the range of the computed derived hail index.

In computing the derived hail index 150, the current embodiment of the system 10 retrieves the probability of severe hail 110 data, the vertically integrated liquid 120 data, the enhanced echo tops 130 data, and VIL density 140 data for an area. The input meteorological data includes probability of severe hail 110 data. This is commonly available for an area within the selected geographic region. However, the area corresponding those input points varies depending on radar processing resolution, gaps due to radar scan intervals, and other factors. The applicable probability of severe hail 110 data of the input meteorological data is retrieved by selecting those points having a latitude & longitude within or adjacent the selected geographic region. VIL density 140 is commonly available as clusters and is retrieved from the meteorological data in a similar manner.

As previously disclosed, the exemplary embodiment of the system 10 assigns a derived hail index 150 to each data point within the data packet corresponding to a pixel to be displayed. The derived hail index is a number calculated based on the product of VILD and POSH. Optionally, the derived hail index is scaled. Where a probability of severe hail 110 data is available for pixel data representing a latitude/longitude position within the selected geographic region, one configuration of the system 10 for computing the derived hail index 150 employs the following formula:

Ceiling(VILD*(POSH/2)/100+VILD,max)

where VILD is vertically integrated liquid digital density for the cluster containing the latitude/longitude position, POSH is probability of severe hail for the latitude/longitude position, and max is the configured upper end of the scale.

In some cases, probability of severe hail 110 data is unavailable for pixel data representing a latitude/longitude. In such a case, the system will substitute or calculate a suitable probability of severe hail 110 point based on proximate POSH data within a preconfigured maximum distance threshold from available data. The maximum distance threshold is determined by comparing available probability of severe hail 110 data to VIL density 140 clusters, where a suitable proximate probability of severe hail 110 point is available. On one configuration, the system 10 employs the above disclosed formula to that point adjusted by the following distance adjustment formula:

((ACOS(SIN(posh_lat*PI/180)*SIN(vildp_lat*PI/180)+COS(posh_lat*PI/180)*COS(vild_p_lat*PI/180)*COS((posh_lon−vildp_lon)*PI/180))*180/PI)*60*1.1515)

where posh_lat is the latitude of the proximate probability of severe hail point, vild_p_lat is the latitude for the proximate VIL density cluster, posh_lon is the longitude of the proximate probability of severe hail point, vild_p_lon is the longitude for the proximate VIL density cluster.

The process of forming the data packets 100 110 120 130 140 150 is repeated with chronologically subsequent time slices of the meteorological data to form the series of data packets. The data packets are stored for retrieval. In one configuration, a data packet is transformed to an image for transmittal to a display 24. In the exemplary configuration, each of the data packets in the series is transformed into a composite animated sequence image for transmission to a display 24, illustrating the hail intensity within the selected region and time window. It would be understood by those skilled in the meteorological data processing art that the system 10 and corresponding methods of processing and displaying meteorological data may be disseminated in a variety of ways. The data packets or images may be provided and encoded for the recipients to receive by internet, radio, television, or other media.

Figure 5A:
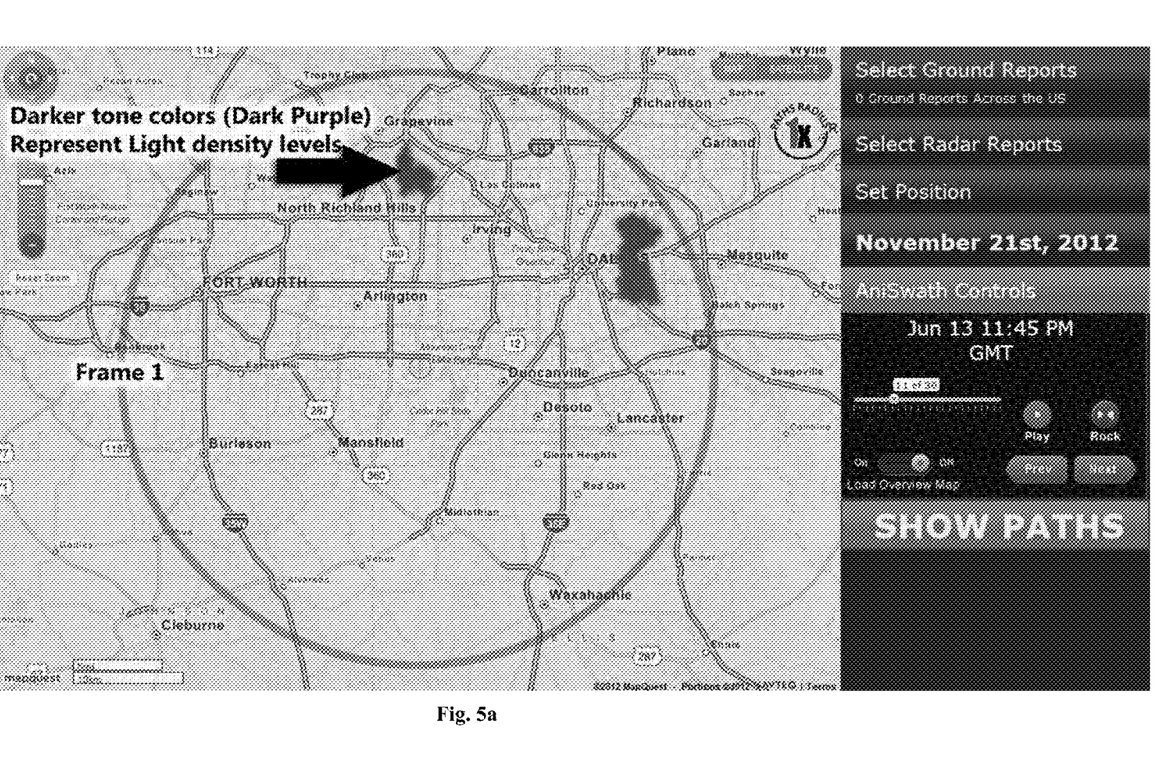
FIG. 5A depicts a representative early visual frame of a series in light hail intensity conditions.
Figure 5B:
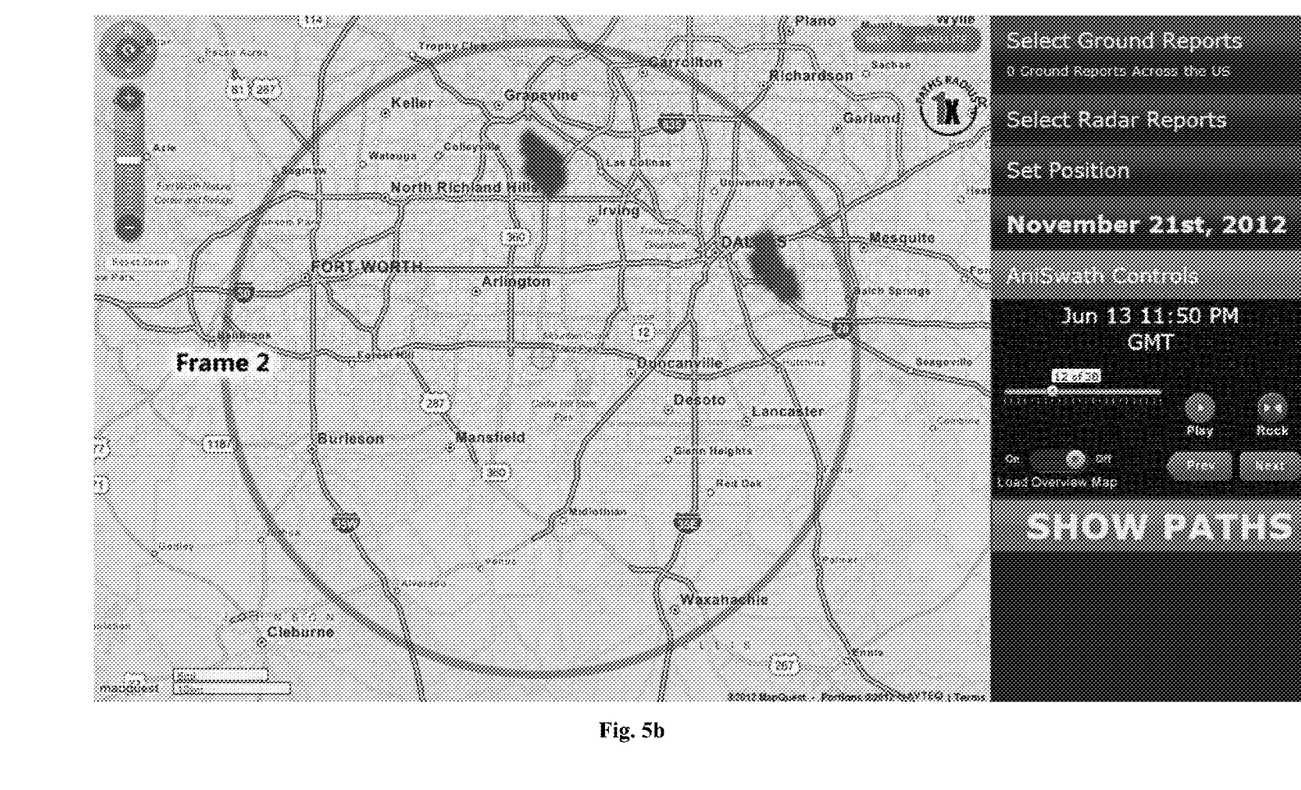
FIG. 5B depicts a representative middle visual frame of a series in light hail intensity conditions.
Figure 5C:
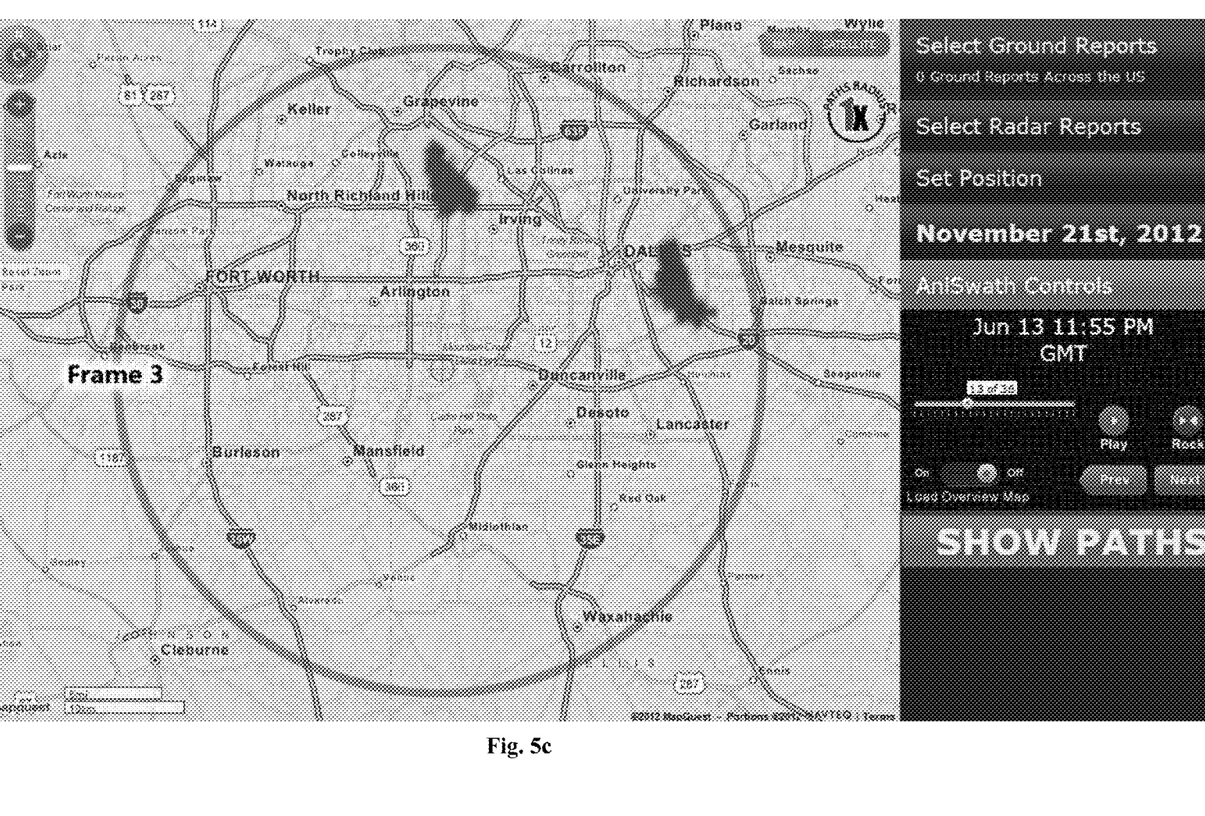
FIG. 5C depicts a representative later visual frame of a series in light hail intensity conditions.
Figure 6A:
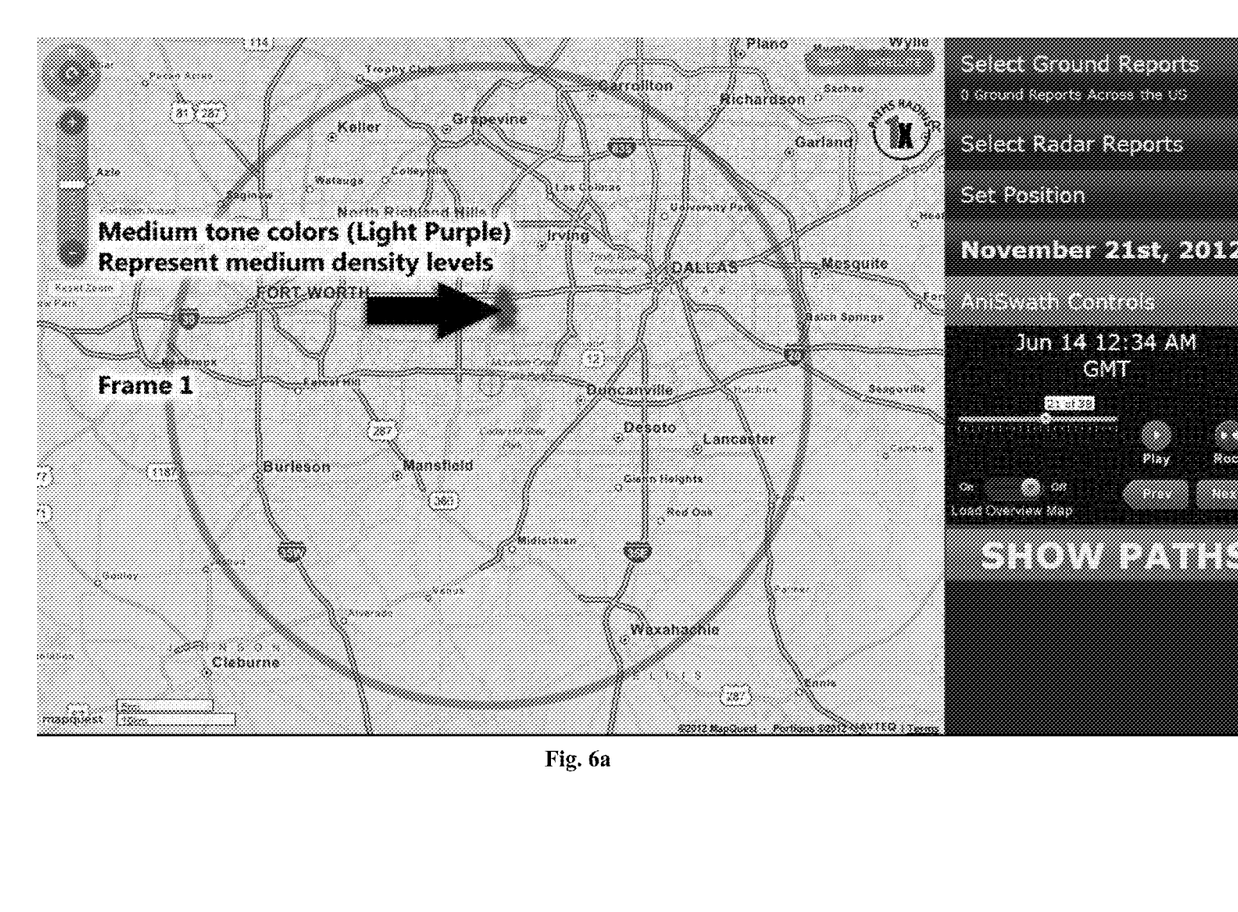
FIG. 6A depicts a representative early visual frame of a series in moderate hail intensity conditions.
Figure 6B:
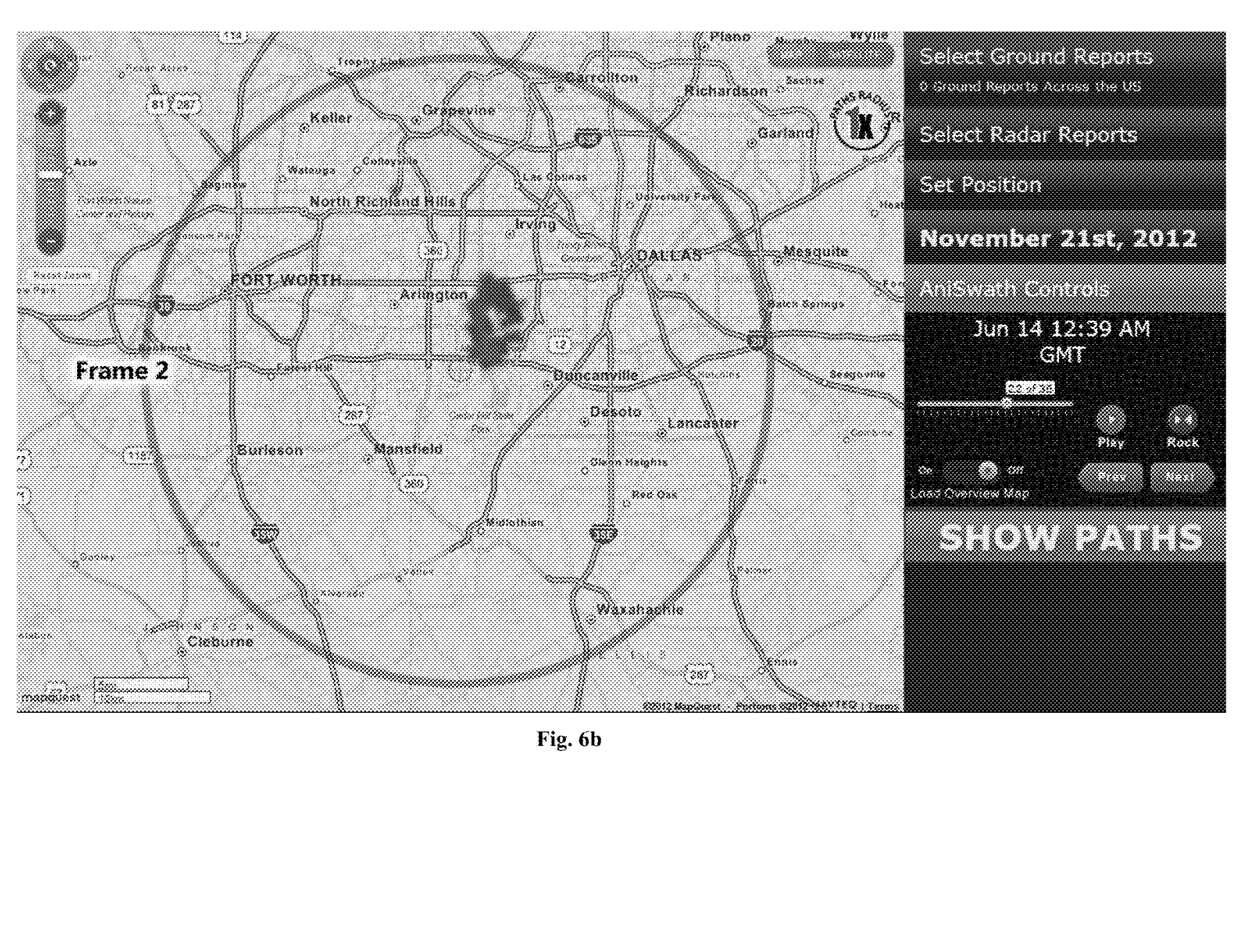
FIG. 6B depicts a representative middle visual frame of a series in moderate hail intensity conditions.
Figure 6C:
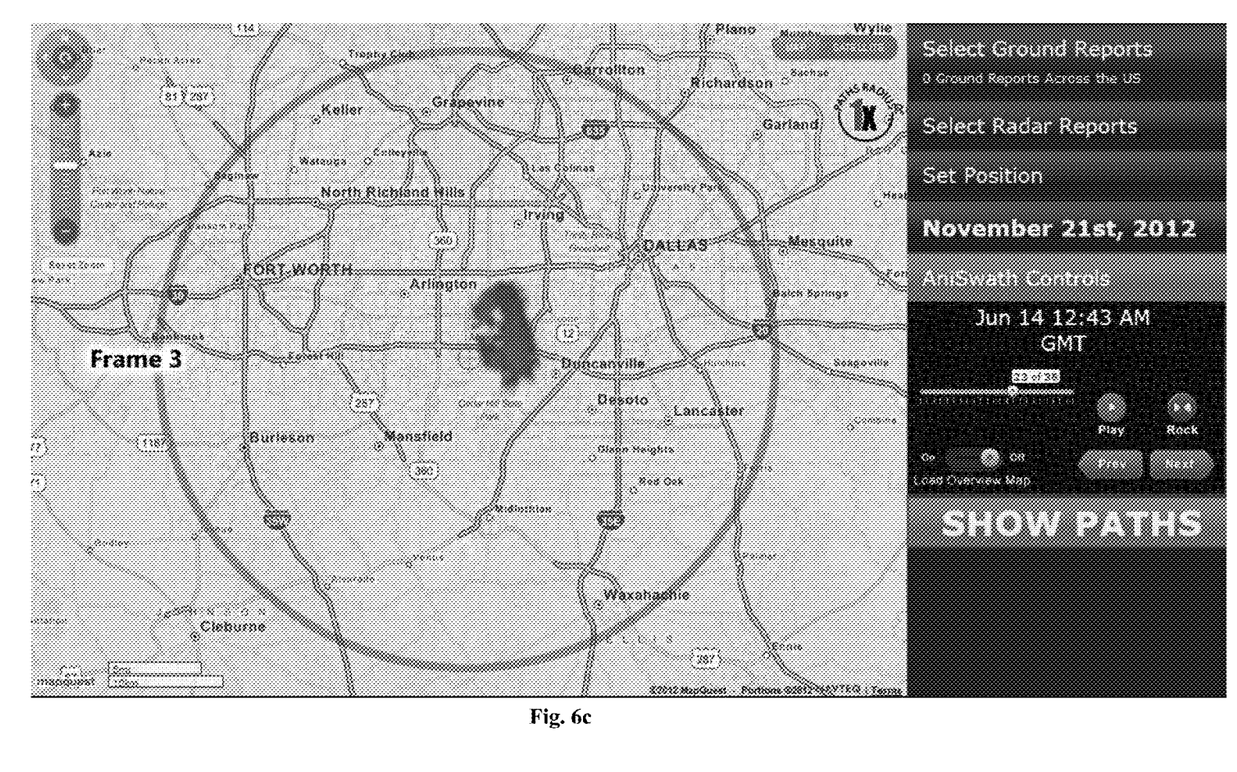
FIG. 6C depicts a representative later visual frame of a series in moderate hail intensity conditions.
Figure 7A:
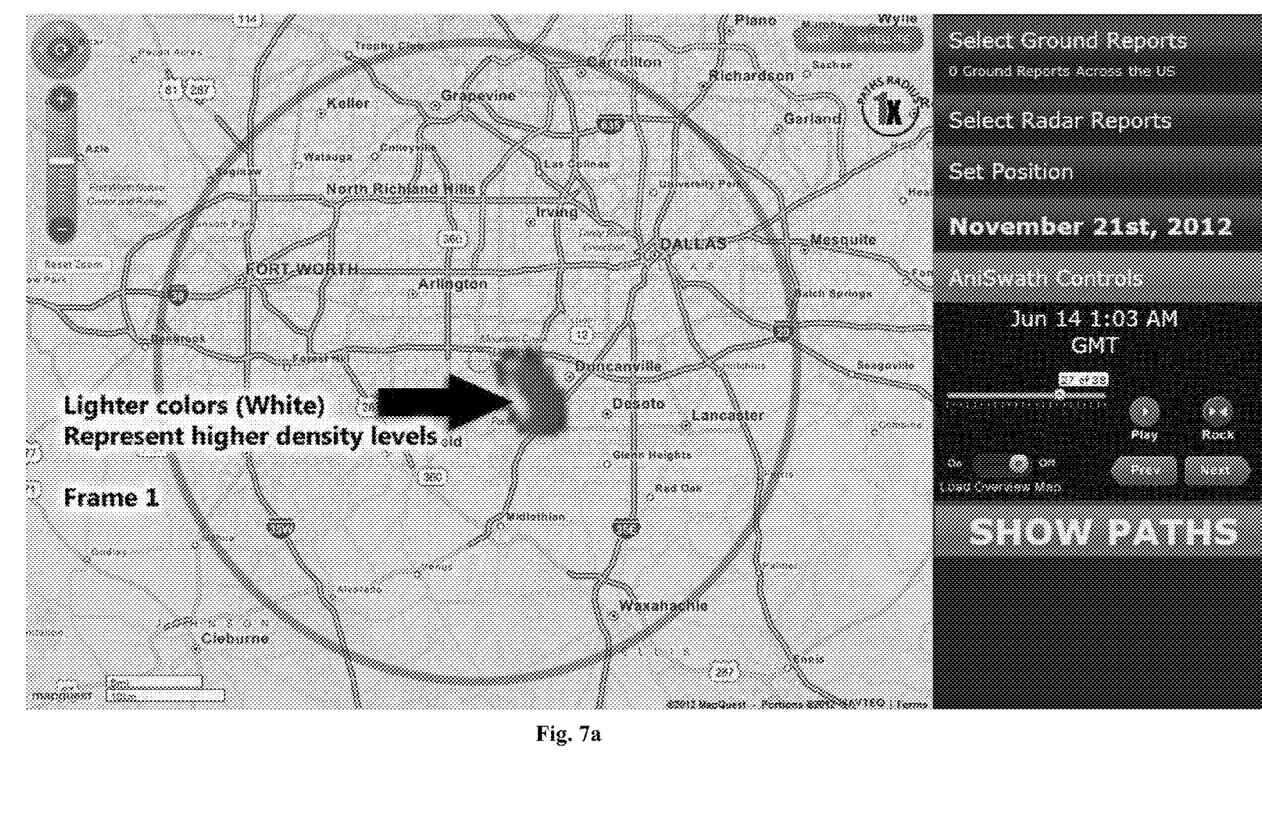
FIG. 7A depicts a representative early visual frame of a series in severe hail intensity conditions.
Figure 7B:
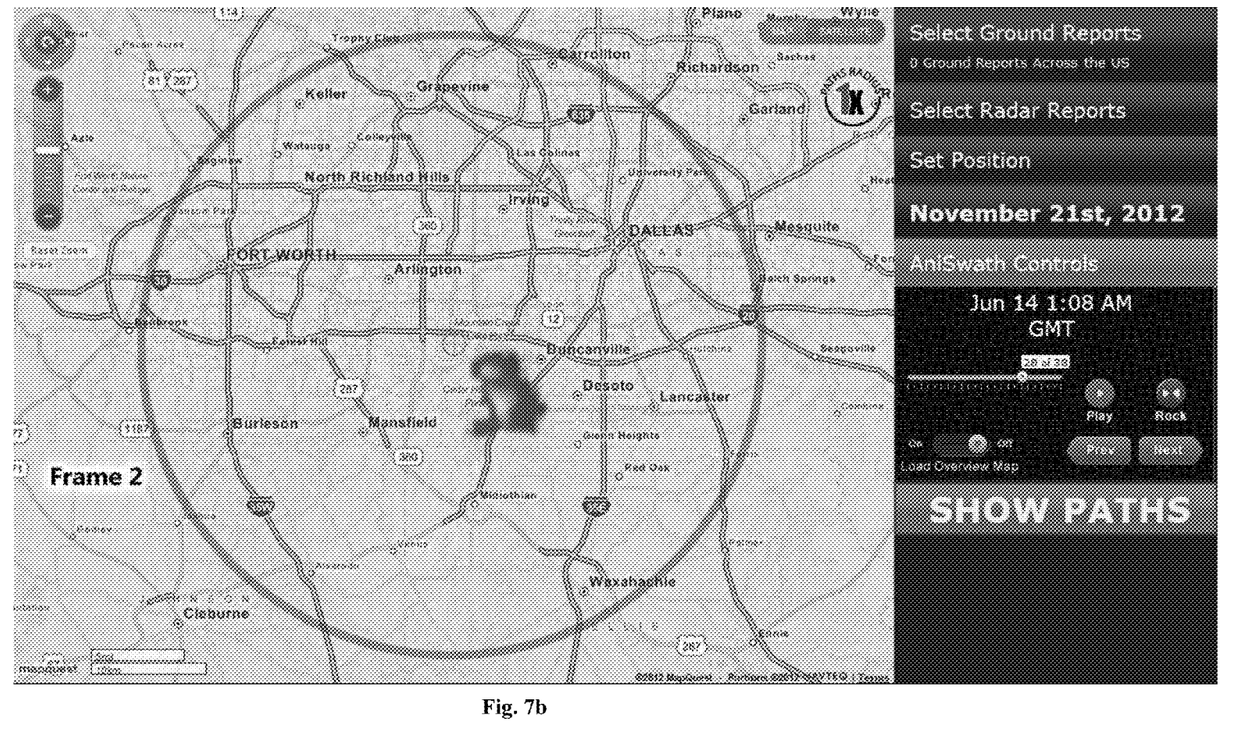
FIG. 7B depicts a representative middle visual frame of a series in severe hail intensity conditions.
Figure 7C:
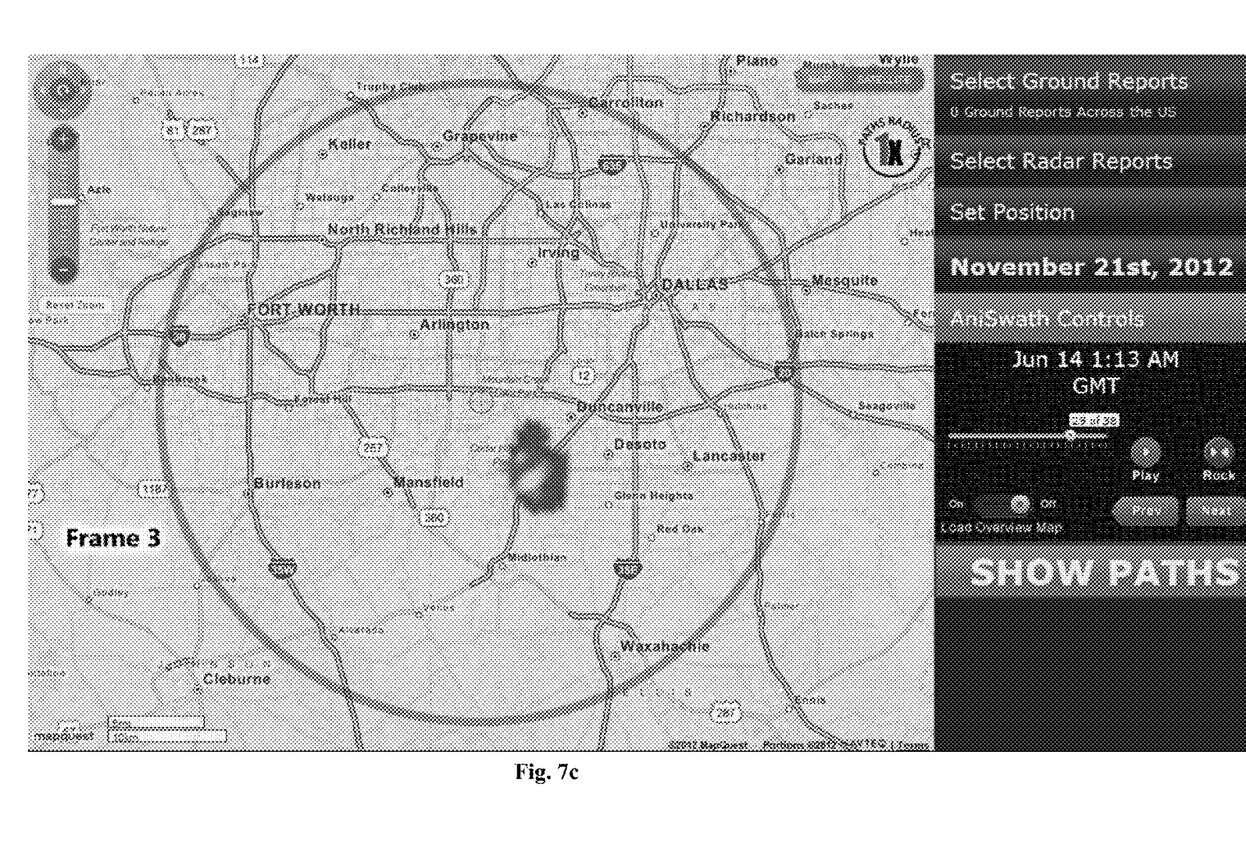
FIG. 7C depicts a representative later visual frame of a series in severe hail intensity conditions.

FIGS. 5A-C display early, middle, and later resultant images within an animation sequence transformed from data packets representing light hail activity. FIGS. 6A-C display early, middle, and later resultant images within an animation sequence transformed from data packets representing moderate hail activity. FIGS. 7A-C display early, middle, and later resultant images within an animation series transformed from data packets representing severe hail activity.

Insofar as the description above, and the accompanying drawing disclose any additional subject matter that is not within the scope of the single claim below, the inventions are not dedicated to the public and the right to file one or more applications to claim such additional inventions is reserved.

What is claimed is:

1. A method of processing weather data for display comprising:
   providing a processor and memory configured to perform the following steps
      receiving a meteorological data corresponding to a geographic region from at least one meteorological data source for a selected time slice, the meteorological data including radar reflectivity data;
      processing said meteorological data to derive probability of severe hail for points within the geographic region;
      processing said meteorological data to derive vertically integrated liquid for said points within the geographic region;
      processing said meteorological data to derive enhanced echo tops for said points within the geographic region;
      processing said vertically integrated liquid and said enhanced echo tops to derive vertically integrated liquid density for said points within the geographic region;
      calculating a derived hail index as a function of the product of said probability of severe hail and said vertically integrated liquid density for said points within the geographic region, said derived hail index being a value proportional to the intensity of the hail activity for visual representation; and
      generating a data packet of said derived hail index numbers, each of said derived hail index numbers corresponding to a local geographic point.

2. The method of claim 1, wherein said derived hail index is scaled within a preconfigured range, the maximum value of said range is about 1.5 times said vertically integrated liquid value.

3. The method of claim 1, further comprising transforming said data packet into a graphical image format.

4. The method of claim 3, further comprising visual map data corresponding to the geographic points of said derived hail index numbers.

5. The method of claim 1, further comprising generating a second data packet from meteorological data source for subsequent selected time slice.

6. The method of claim 1, further comprising generating a second data packet from said meteorological data source for a subsequent selected time slice, transforming said data packets into a graphical image format, said graphical format comprising an ordered image sequence of said first data packet followed by said second data packet.

7. The method of claim 5, further comprising transmitting said first data packets and said second data packet for display.

8. The method of claim 1, further comprising retrieving geographically proximate probability of severe hail data within a preconfigured distance threshold of said points where probability of severe hail data where probability of severe hail data is unavailable or unreliable.

9. The method of claim 8, further comprising adjusting said geographically proximate probability of severe hail data sinusoidally proportional from said point.

10. A system for processing weather data for display comprising:
    a processor configured to receive meteorological data corresponding to a geographic region from at least one meteorological data source for a selected time slice, the meteorological data including radar reflectivity data;
    said processor configured to process said meteorological data to derive probability of severe hail for points within the geographic region;
    said processor configured to process said meteorological data to derive vertically integrated liquid for said points within the geographic region;
    said processor configured to process said meteorological data to derive enhanced echo tops for said points within the geographic region;
    said processor configured to process said vertically integrated liquid and said enhanced echo tops to derive vertically integrated liquid density for said points within the geographic region;
    said processor configured to calculate a derived hail index as a function of the product of said probability of severe hail and said vertically integrated liquid density for said points within the geographic region, said derived hail index being a value proportional to the intensity of the hail activity for visual representation; and
    generating a data packet of said derived hail index numbers, each of said derived hail index numbers corresponding to a local geographic point.

11. The system of claim 10, wherein said derived hail index is scaled within a preconfigured range, the maximum value of said range is about 1.5 times said vertically integrated liquid value.

12. The system of claim 10, further comprising transforming said data packet into a graphical image format.

13. The system of claim 12, further comprising visual map data corresponding to the geographic points of said derived hail index numbers.

14. The system of claim 10, further comprising generating a second data packet from meteorological data source for subsequent selected time slice.

15. The system of claim 10, further comprising generating a second data packet from said meteorological data source for subsequent selected time slice, transforming said data packets into a graphical image format, said graphical format comprising an ordered image sequence of said first data packet followed by said second data packet.

16. The system of claim 14, further comprising transmitting said first data packets and said second data packet for display.

17. The system of claim 10, further comprising retrieving geographically proximate probability of severe hail data within a preconfigured distance threshold of said points where probability of severe hail data where probability of severe hail data is unavailable or unreliable.

18. The system of claim 17, further comprising adjusting said geographically proximate probability of severe hail data sinusoidally proportional from said point.

* * * * *